United States Patent [19]

Davis

[11] 4,216,101

[45] Aug. 5, 1980

[54] ELECTRICAL INSULATING COMPOSITION BASED ON POLYOLEFIN CONTAINING DYE ADDITIVES AS VOLTAGE STABILIZERS

[75] Inventor: H. John Davis, Beaconsfield, Canada

[73] Assignee: Canada Wire and Cable Limited, Toronto, Canada

[21] Appl. No.: 944,021

[22] Filed: Sep. 20, 1978

[51] Int. Cl.$^2$ .............................................. H01B 3/30
[52] U.S. Cl. ................................ 252/63.2; 252/63.7; 252/64
[58] Field of Search ................... 252/63.2, 63.7, 64; 174/110 PM, 110 SR; 260/42.21; 8/180

[56] References Cited

U.S. PATENT DOCUMENTS

| | | | |
|---|---|---|---|
| 3,046,076 | 7/1962 | Upshur | 8/180 X |
| 3,069,220 | 12/1962 | Dawson | 8/180 X |
| 3,346,500 | 10/1967 | Hunt | 252/63.2 |
| 3,499,791 | 3/1970 | Maloney | 428/379 |
| 3,522,183 | 7/1970 | Heidt | 252/63.7 |
| 3,577,346 | 5/1971 | McKeown | 252/63.5 |
| 3,632,680 | 1/1972 | Hunt et al. | 260/878 |
| 3,674,695 | 7/1972 | Wuerstlin et al. | 252/63.2 |
| 4,035,311 | 7/1977 | Feichtmayr et al. | 252/63.2 |

FOREIGN PATENT DOCUMENTS 875026 7/1971 Canada .
919331 1/1973 Canada .

OTHER PUBLICATIONS

Ashcraft et al, "Laboratory Studies of Treeing in Solid Dielectrics and Voltage Stabilization of Polyethylene", IEEE Conference Record 1976, pp. 213-218.

*Primary Examiner*—Harris A. Pitlick
*Attorney, Agent, or Firm*—Fleit & Jacobson

[57] ABSTRACT

A voltage stabilized solid polyolefin dielectric composition is disclosed. The dielectric composition comprises a polyolefin containing a voltage stabilizing amount of an additive selected from the class of dyes identified in the Color Index as being of the solvent type possessing either an azo or a quinoid type structure, or having a xanthene structure exhibiting fluorescence. The solvent dyes must be soluble in or melt miscible with the polyolefin. The solvent dyes must also be stable at the processing temperature and under the conditions of use.

7 Claims, No Drawings

ELECTRICAL INSULATING COMPOSITION BASED ON POLYOLEFIN CONTAINING DYE ADDITIVES AS VOLTAGE STABILIZERS

This invention relates to additives for improving the voltage stability of polyolefin based dielectric compositions for use at high voltages.

It has been repeatedly observed that polyolefinic insulation of high voltage cables often fails as a result of preferentially conductive paths being formed in the insulation. These conductive paths grow with time and electrical stress and ultimately bridge the high voltage conductors to ground. These conductive paths are often referred to as "trees" because their physical shape often resembles microscopic trees. Such trees are often associated with defects (voids or inclusions) in the insulation. It has been repeatedly demonstrated that voids, inclusions or other defects initiate tree growth and, as a result, a series of tests for resistance to tree growth have been based on introducing "standard defects" into the insulation (c.f. "An Accelerated Screening Test for Polyethylene High Voltage Insulation", AIEE Transactions Paper No. 62-54 (1962) by D. W. Kitchin and O. S. Pratt, and "Laboratory Studies of Treeing in Solid Dielectrics and Voltage Stabilization of Polyethylene", IEEE Conference Record of 1976, IEEE International Symposium on Electrical Insulation, Montreal, June 14–16, 1976, p. 213, IEEE Publication No. 76 CH1 088-4-EI, by A. C. Ashcraft, R. M. Eichhorn and R. G. Shaw). These test methods have been shown to correlate well with life tests on activated cables and consequently give a suitable and quick method of screening modified insulations for "treeing resistance". As a consequence of test methods such as these, a number of materials have been discovered for use as additive agents for increasing the resistance to treeing of the electrically insulating resins, and a number of patents have been issued in this area. Typical examples of such patents are U.S. Pat. No. 3,522,183 issued July 28, 1970 to L. J. Heidt, U.S. Pat. No. 3,632,680 issued January 4, 1972 to G. H. Hunt et al., U.S. Pat. No. 3,346,500 issued Oct. 10, 1967 to G. H. Hunt and Canadian Pat. No. 875,026 issued July 6, 1971 to G. H. Hunt, covering the use of such materials as halogenated polycyclic aromatic compounds and substituted aromatic hydrocarbon compounds, particularly the nitro-substituted aromatic hydrocarbon compounds; U.S. Pat. No. 3,577,346 issued May 4, 1971 to J. J. McKeown covering the use of organo metallic compounds; U.S. Pat. No. 3,499,791 issued Mar. 10, 1970 to D. E. Maloney covering the use of quaternary ammonium salts and Canadian Patent No. 919,331 issued Jan. 16, 1973 to F. Wuerstlin et al. covering the use of various substituted anilines. Many of these compounds have problems associated with their use as voltage stabilizers, such as: being injurious to health and/or explosive; causing degradation of other polymer characteristics such as flammability, mechanical properties, electrical loss factor etc.; and/or being difficult to procure and use. Consequently, other voltage stabilizers without these and other disadvantages have been sought with the capability of being used in grades of polyolefins used commercially for the insulation of high voltage cables.

Applicant has surprisingly found that certain classes of dyes, which are not normally recommended for coloring polyolefins and for which no enhancement of electrical properties was previously known, can effect substantial improvements in the resistance of polyolefins to treeing. The classes of dyes which have been found to be effective as voltage stabilizers are identified in the Color Index as being of the solvent type and possess either an azo or a quinoid type structure, or have a xanthene structure exhibiting fluorescence. The solvent dyes must be soluble or melt miscible with the polyolefin. The solvent type dyes must also be stable at the processing temperature and under the conditions of use.

Some members of the azo dyes which have been found particularly good are the monoazo solvent yellow 2 and 56 identified in the Color Index as Nos. 11020 and 11021, respectively, the monoazo solvent orange 7 (C.I. No. 12140) and the diazo solvent red 19 and 26 (C.I. Nos. 26050 and 26120 respectively). Other suitable members of the azo family are: the solvent yellow monoazo dyes identified by the Color Index Nos. 11000, 11129, 11160, 11350, 11380, 11390, 11800, 11810, 11830, 11840, 11850, 11855, 11860, 12055, 12700, 12740, 13900:1, 14070 and 18690; the solvent yellow diazo dyes identified by the Color Index Nos. 20010, 21230 and 21240; the solvent orange monoazo dyes identified by the Color Index Nos. 11005, 11270:1, 11320:1, 11700, 11920, 12100, 12125, 18745:1 and 18736:1, the solvent orange diazo dyes identified by the Color Index Nos. 20020, 26020 and 26075; the solvent orange azo dye identified by the Color Index No. 26080; the solvent red monoazo dyes identified by the Color Index Nos. 11215, 11385, 12005, 12010, 12150, 12155, 12156, 12159, 12170, and 12715; the solvent red diazo dyes identified by the Color Index Nos. 21250, 21264, 26100, 26105, 26110, 26125, 26030, 26766, 26705 and 27306; the solvent brown monoazo dyes identified by the Color Index Nos. 11285, 11330, 11360, 12000 and 12020; the solvent brown diazo dyes identified by the Color Index Nos. 21000:1 and 21010:1, and the solvent black diazo dyes identified by the Color Index Nos. 26040 and 26150.

A member of the quinoid dyes which has shown good results is the anthraquinone solvent dye violet 13 identified in the Color Index as No. 60725. Other suitable members of the same family are: the anthraquinone solvent yellow 100, solvent orange 55, solvent orange 64, solvent orange 65 and solvent orange 66; the anthraquinone solvent red 52 (Color Index No. 68210), solvent violet 11 (Color Index No. 61100), solvent violet 12 (Color Index No. 61105), solvent violet 14 (Color Index No. 61705), solvent violet 26 (Color Index No. 62015), solvent blue 11 (Color Index No. 61525), solvent blue 12 (Color Index No. 62100), solvent blue 14 (Color Index No. 61555), solvent blue 18 (Color Index No. 64500), solvent blue 26 (Color Index No. 61561), solvent blue 63 (Color Index No. 61520, solvent blue 68 (Color Index No. 61110), solvent blue 69 (Color Index No. 62500), solvent blue 78 (Color Index No. 61500), and solvent green 3 (Color Index No. 61565).

The xanthene dyes exhibiting fluorescence which have been found suitable are, for example, the xanthene solvent green 4 identified by the Color Index No. 45550, and the xanthene dye identified by the Color Index No. 45555.

The dyes are present in a voltage stabilizing amount which is preferably from about 0.1 to about 10% by weight based upon the weight of the polyolefin. The solid dielectric composition may also contain other conventional additives used in electrical insulation materials to effect crosslinking of the polyolefin during processing or to otherwise render the material more suitable for use in cables, such as thermal degradation stabilizers, light stabilizers, carbon black and other pigments or fillers.

Before proceeding further with the description, let us mention that the test method used by Ashcraft, A. C., Eichhorn, R. M. and Shaw, R. G., as reported in pages 213–218 of the IEEE Conf. Record of the 1976 IEEE International Symposium on Electrical Insulation identified above, has been used by the applicant for all the voltage stabilization tests reported in the description with one modification. The "Standard Defects" used by Ashcraft et al. were made by specially sharpening No. 7 Sharp sewing needles, whereas the present tests have employed commercially available extra sharp needles fabricated by the Ogura Jewel Company of Tokyo, Japan and identified by them as part No. X-253-3. Using these needles and the method of Ashcraft et al., a double needle characteristic voltage (DNCV) of 12.4±1.0 kV has been obtained for a low density polyethylene having a specific gravity of 0.92 and a melt index of 0.2 (this polyethylene is identified as type DYNK-2 in the above paper and in the following description).

The solvent dye additive is incorporated into the base resin while the resin is heated to a temperature above the melting point of the base resin. The dye must be soluble in or at least melt miscible with the base resin at that temperature in order to improve the voltage stabilization. Dyes which are not soluble or melt miscible with the polyethylene do not offer the same degree of improvement in voltage stability. Indeed, the diazo pigment identified as pigment yellow 13 (Color Index No. 21100) and having the chemical formula:

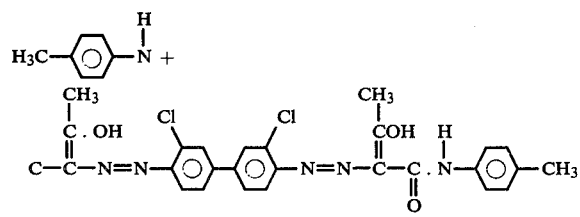

which is a recommended coloring vehicle for polyolefins does not dissolve to any appreciable extent in polyethylene and does not melt at or below normal polyethylene processing temperatures. When mixed into the polyethylene melt, the pigment remains, for the most part, as a discrete second phase even at the low concentration of 0.1 wt.%. The double needle characteristic voltage of a DYNK-2 polyethylene containing this loading (0.1 wt%) of pigment yellow 13 was determined to be 13.0±0.7 kV which is substantially the same as the value obtained for the base resin. The same loading of the melt miscible azo dye identified as solvent yellow 56, Color Index No. 11021, however, produced DNCV values of 16.1±1.7 kV and of 14.4±1.4 kV in two separate determinations. These values are significantly higher than that of the base resin in spite of the very low loading of dye present. The importance of solubility in or melt miscibility with the base resin has also been observed wheh using quinoid type dyes. Quinoid vat dyes, for example, do not effect the same improvements in voltage stability. Applicant has found, for example, that a dispersion in DYNK-2 polyethylene of vat orange 3 (Color Index 59,300) having the following formula:

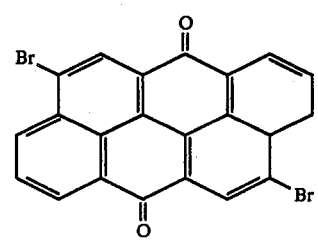

which contains the quinoid grouping actually caused a decrease in the DNCV to 10.9±0.3 kV. A similar result was reported by Ashcraft et al. for flavanthrone, also known as vat yellow 1, and having the chemical structure:

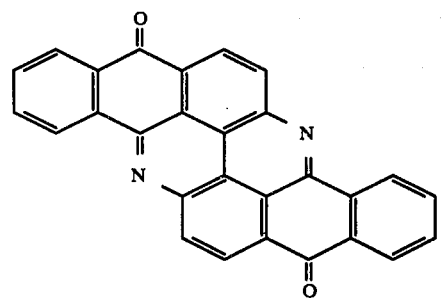

and for violanthrone, having the structure:

Similar limitations are expected for the quinoid pigments, such as pigment red 122, which is a linear quinacridone of the general formula:

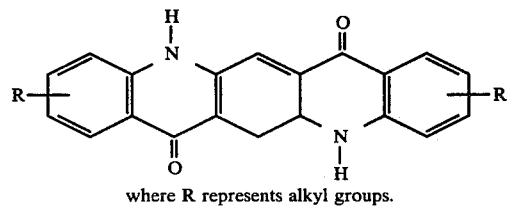

where R represents alkyl groups.

This material does not appear to be soluble in or melt miscible with polyethylene, but nevertheless is a good and recommended coloring agent.

The solvent dye additive may be incorporated into the base resin using any conventional mixing and blending apparatus such as twin-roll mills, Banbury mixers, or compounding extruders, provided that such apparatus produce an homogeneous melt. In one method used for the applicant for making samples for testing, the solvent dye was compounded into a base resin by adding the requisite weight of the additive to the base resin which was being heated in a twin-roll mill to a temperature just above the melting point of the base resin and then continuing to mill the mix until a uniform color was achieved. The correct incorporation of the dye into the base resin can be determined by examining the surface or a section of the processed resin optically, at a magnification of 100X, by means of a microscope. A uniform color, without the presence of discernible areas of high coloration, at this magnification, can be taken as indicative of suitable melt visibility and mixing. Should discrete particles or highly colored areas remain visible under such an examination, then additional processing, higher processing temperatures or an incompatible system are indicated.

EXAMPLES

Test samples of DYNK-2 polyethylene having a melting point of approx. 110° C. and containing 0.5 wt% of various azo dyes as voltage stabilizers were made using a twin-roll mill heated to 160° C. The samples were prepared from the material by hot pressing in a suitably shaped mold. The values recorded for the double needle characteristic voltage of such samples are given in the following Table I:

In all cases, a substantial improvement of the voltage necessary to initiate treeing is observed as compared to a DYNK-2 polyethylene without a stabilizer which was used as a control and which has been found to have a double needle characteristic voltage (DNCV) of 12.4±1 kV.

Similar improvements in DNCV's have been observed for additions of quinoid type dyes and dyes having a xanthene structure exhibiting fluorescence and meeting the criteria of solubility in and/or melt miscibility with the base resin. Some examples of observed DNCV's for dyes in these categories are given in the following Table II:

TABLE II

| Color Index Designation | Color Index No. | Chemical Formula and Chemical Name | M.P. °C. | Base Resin | wt % of add. | DNCV kV | Remarks |
| --- | --- | --- | --- | --- | --- | --- | --- |
| Solvent Red 138 | | | 252 | DYNK-2 P.E. | 0.5 | 16.4 ± 0.6 | Anthraquinone red |
| Solvent Violet 13 | 60725 | (anthraquinone structure with NH-C6H4-CH3) | 152 (partial) (small) 191 | DYNK-2 P.E. | 0.5 | 21.3 ± 2.2 | Anthraquinone |
| Solvent Green 4 (sample #7) | 45550 | (xanthene structure with two CH3 groups) | 148 | DYNK-2 P.E. | 0.5 | 23.4 ± 0.9 | Fluorescent dye |

Solvent red 138 listed in Table II has a melting point of 252° C. which is higher than the processing temperature (160° C.) and when the sample was examined under the microscope, a nonhomogeneous colour could be seen although some solution of the dye in the base resin had obviously occurred. This explains the lower

TABLE I

| Color Index Designation | Color Index No. | Dye Type | Chemical Formula | M.P. °C. | DNCV at 0.5 wt % in type DYNK-2 P.E. |
| --- | --- | --- | --- | --- | --- |
| Solvent Yellow 2 | 11020 | Azo | Ph—N=N—C6H4—N.(CH3)2 | 98 | 19.2 ± 1.9 kV |
| Solvent Yellow 55 | 11021 | Azo | Ph—N=N—C6H4—N.(C2H5)2 | 98 | 20.8 ± 1.3 kV |
| Solvent Orange 7 | 12140 | Azo | CH3-C6H3(CH3)—N=N—naphthol | 123 | 22.5 ± 0.6 kV |
| Solvent Red 19 | 26050 | Diazo | Ph—N=N—C6H4—N=N—naphthyl | 144 | 20.9 ± 0.5 kV |
| Solvent Red 26 | 26120 | Diazo | CH3-C6H4—N=N—C6H2(CH3)2—N=N—naphthyl | 137 | 17.5 ± 0.9 kV |

DNCV (16.4±0.6) obtained for this material. This is a good example of a material of a suitable chemical type which has been incorporated into the base resin at a temperature which is lower than the critical temperature.

The amounts of the above mentioned solvent dyes, of the azo, quinoid and xanthene types, which should be incorporated into polyolefins in order to effect improvements in resistance to treeing are governed by different considerations controlling the low and high limits. The lower limit of addition of the voltage stabilizing additive is controlled by the level at which any voltage stabilization effect can be seen. This is typically at 0.1 wt% of additive. The upper limit is controlled by economic considerations and by the effect large additions of voltage stabilizers might have on other important chemical, physical or electrical properties of the insulation. The upper level limit thus changes with the nature of the application and the required degree of stabilization. Weight percentages over 10 wt% would be excessive for many applications. From the above, it can be seen that the amount of the stabilizing agent is preferably within the range of about 0.1 to about 10 wt%, most preferably 0.1 to 2 wt%, although not necessarily restricted to this range.

Although the invention has been disclosed with reference to polyethylene, it is to be understood that other polyolefin resins suitable for making solid dielectric compositions are also envisaged. Furthermore, the invention is not limited to the use of the additives given in Tables I and II as non-limitative specific examples of suitable stabilizing dyes according to the present invention, but extended to all additives claimed in the appended claims.

What is claimed is:

1. An electrical insulating composition comprising a polyolefin, at least one additive for improving the voltage stability of the electrical insulating composition selected from the class of dyes identified in the Color Index as being of the solvent type possessing either an azo or a quinoid type structure, or having a xanthene structure exhibiting fluorescence, which dyes are soluble in or melt miscible with the polyolefin, and other conventional additives used in electrical insulation materials.

2. An electrical insulating composition as defined in claim 1, wherein the polyolefin is polyethylene.

3. An electrical insulating composition as defined in claims 1 or 2, wherein the additive is a solvent dye possessing an azo type structure identified in the Color Index as Nos. 11021, 11020, 12140, 26120 or 26050.

4. An electrical insulating composition as defined in claims 1 or 2, wherein the additive is a solvent dye possessing a quinoid type structure identified in the Color Index as No. 60725.

5. An electrical insulating composition as defined in claims 1 or 2, wherein the additive is a solvent dye possessing a xanthene type structure exhibiting fluorescence identified in the Color Index as No. 45550.

6. An electrical insulating composition as defined in claims 1 or 2, wherein the dye is present in an amount of from about 0.1 to about 10% by weight based upon the weight of the polyolefin.

7. An electrical insulating composition as defined in claims 1 or 2, wherein the dye is present in an amount of from 0.1 to 2% by weight based upon the weight of the polyolefin.

* * * * *